United States Patent [19]

Choay

[11] 3,857,950

[45] Dec. 31, 1974

[54] THERAPEUTICAL COMPOSITION OF N-PROPIONYL-EPSILON-AMINO-CAPROIC ACID WITH METHOD OF TREATMENT

[75] Inventor: Jean Choay, Neuilly-sur-Seine, France

[73] Assignee: Choay S.A., Paris, France

[22] Filed: June 21, 1972

[21] Appl. No.: 264,753

Related U.S. Application Data

[63] Continuation-in-part of Ser. No. 820,298, April 29, 1969, abandoned.

[30] Foreign Application Priority Data

May 3, 1968 France .............................. 68.150414
Aug. 2, 1968 France .............................. 68.161612

[52] U.S. Cl. ............................ 424/319, 260/534 R
[51] Int. Cl. .......................................... A61k 27/00
[58] Field of Search .................. 424/319; 260/534 R

[56] References Cited

OTHER PUBLICATIONS

Chem. Abst., Vol. 65, 1267d, (1966).
March, "Advanced Organic Chemistry," McGraw Hill & Sons, (1968), p. 336.

*Primary Examiner*—Stanley J. Friedman
*Attorney, Agent, or Firm*—Michael S. Striker

[57] ABSTRACT

A pharmaceutical composition for the treatment of disorders in the formation of connective tissue comprises N-propionyl-ε-amino-caproic acid or one of its pharmaceutically acceptable salts as effective agent and a pharmaceutically acceptable carrier therefor.

The method of treatment comprises treating a patient with the described composition for the purpose of improving disorders in the formation of the connective tissue of the skin, bones, tendons or internal organs.

2 Claims, 2 Drawing Figures

THERAPEUTICAL COMPOSITION OF N-PROPIONYL-EPSILON-AMINO-CAPROIC ACID WITH METHOD OF TREATMENT

CROSS-REFERENCES TO RELATED APPLICATIONS

This application is a continuation-in-part application of application Ser. No. 820,298, filed on Apr. 29, 1969 for N-PROPIONYL-ε-AMINO-CAPROIC ACID, METHOD OF PREPARING THE SAME AND THERAPEUTIC APPLICATIONS THEREOF by the same inventor and now abandoned.

BACKGROUND OF THE INVENTION

This invention relates to pharmaceutical compositions and a method of treatment wherein N-propionyl-ε-amino-caproic acid is the effective agent. The structure and making of the compound has been in detail described in the above referred to parent application and is now the subject matter of a divisional application, Ser. No. 104,495 filed Jan. 6, 1971.

The formula of N-propionyl-ε-amino-caproic acid is $CH_3CH_2-CO-NH-(CH_2)_5-COOH$.

This acid is prepared by reacting propionic anhydride with ε-amino-caproic acid.

N-propionyl-ε-amino-caproic acid is a substance melting at about 45° to 58°C according to its degree of purity; it is highly soluble in trichloroethylene, ethanol and water, scarcely soluble in ether and insoluble in hexane.

The sodium salt of N-propionyl-ε-amino-caproic acid is a compound having the formula $CH_3-CH_2-CO-NH-(CH_2)_5-COO\,Na$, a molecular weight of which is 209.23, and a m.p. of the order of 199° to 201°C; it has the appearance of a white powder soluble in water and alcohol, insoluble in ketone and ether.

The calcium salt of N-propionyl-ε-amino-caproic acid is a compound having the formula $[CH_3-CH_2-CO-NH-(CH_2)_5-COO]_2Ca$, a molecular weight of 412.55 and a m.p. of the order of 179 to 182°C; it has the appearance of a white powder soluble in water and alcohol, insoluble in ketone and ether.

The magnesium salt of N-propionyl-ε-amino-caproic acid is a compound having the formula $[CH_3-CH_2-CO-NH-(CH_2)_5-COO]_2Mg$, a molecular weight of 396.80; it has the appearance of a white powder soluble in water and alcohol, insoluble in ketone and ether.

DETAILS OF THE INVENTION AND SPECIFIC EMBODIMENTS

The action of the compositions of the invention resides in the prevention or improvement of disorders in the formation of connective tissue irrespective of the anatomical site of such tissue. It applies therefore equally to connective tissue of the skin, of the bones, of the tendons and of the internal organs. Its effect particularly rests in the improved control of the collagen synthesis, collagen being one of the constituent elements of the connective tissue.

In all cases it has been found that the free caproic acid derivative is as effective as its pharmaceutically acceptable salts, particularly the sodium, calcium and magnesium salt.

The action of the compositions of the invention may be preventive or curative. It should be understood that the line between these two actions is not sharply defined.

The compositions of the invention are accordingly valuable both as cosmetics and as therapeutical agents.

Insofar as the cosmetic aspects of the invention are concerned the compositions prevent the appearance of wrinkles or improve existing wrinkles.

In the therapeutical area they are effective in the treatment of diseases of the cutaneous cicatrization, of bone union following fractures, of pancreatic scleroses and in the prevention or attenuation of internal bonds and adhesions in the peritoneal region.

Insofar as the connective tissue of the skin is involved in the prevention or attenuation of wrinkles or in the improvement of the cicatrization of wounds the compositions are preferably applied in the form of creams, pomades or similar forms suited for topical administration.

Insofar as the treatment of disorders of the formation of the connection tissue in bones, tendons and internal organs is concerned as well as in the treatment of certain disorders of the connective cutaneous tissue the compositions of the invention are applied in forms suitable for oral application, such as liquids.

The concentration of the effective acid or its salts in the total composition is preferably between 0.25 and 5 g for each 100 g of composition. In the orally applicable solutions the concentration of the effective agent may go as high as 25%.

The carrier vehicle which may be associated with the acid or salts may be those usually associated for preparing creams, pomades or similar topically applicable compositions. In these cases the usual excipients known in cosmetics industry may be used. For the liquids water or other conventional excipients may be used.

Various examples of different carrier vehicles will be furnished in the following examples. Insofar as the carrier vehicles are identified by trademarks their chemical composition has also been indicated. Furthermore detailed chemical identification will be found in the continuation-in-part application filed by the same inventor on or about May 23, 1972 in respect of NOVEL COMPOSITIONS FOR THE TREATMENT OF TROPHIC DISORDERS OF THE INTEGUMENTS. The statements made in that case are specifically incorporated herein by reference.

It is noted that the choice of excipients is not critical, particularly not in the case of creams and pomades, and that other types of fatty carrier vehicles may be substituted for those listed.

Examples of specific creams and ointments and of an orally applicable solution follow.

EXAMPLE 1

Preparation of a cosmetic cream

A cosmetic cream having the following formula was prepared:

| | | |
|---|---|---|
| N-propionyl-ε-amino-caproic acid | 5 | gram |
| "Cosbiol" (perhydrosqualene) | 10 | grams |
| "Xalifin 15" (lipidic substratem consisting of nine fatty acids of $C_8$ to $C_{28}$ forming a self-emulsifying mass in water) A product of the VEVV Company of Italy | 27 | do. |
| Sorbic acid | .4 | do. |
| Deionized water, q.s. | 100 | do. |

Mode of preparation a. Preparation of the oily phase:

The fatty substances and oily excipients: "Cosbiol" and "Xalifin 15" were heated in a water-bath to about 60°–70°C.

b. Preparation of the aqueous phase:

The water-soluble products: Sorbic acid and N-propionyl-ε-amino-caproic acid were dissolved in the amount of water necessary for preparing the end product. The mass was heated to 60°C.

c. The aqueous phase was slowly introduced into the oily phase while agitating it to avoid inclusion of air bubbles. It was then cooled to about 30°C. The pH value of the cream was adjusted to between 5.5 and 5.8. After cooling this was followed by homogenization for refining the cream.

EXAMPLE 2

Preparation of a cosmetic emulsion

A cosmetic emulsion having the following formula was prepared:

| | | |
|---|---|---|
| N-propionyl-ε-amino-caproic acid | 1 | gram |
| "Polystate" (a mixture of mono- and distearic and palmitic esters of polyoxyethyleneglycol 300 also acting as an anti-oxidizer); a product of the Gattefosse Company of France (see Pharmacopee Francaise VIIIe edition page 833) | 1.5 | do. |
| "Tefose 1500" a product of the Gattefosse Company (mono- and distearates of polyoxyethyleneglycol 1540) | 3 | do. |
| Wheat germ oil | 5 | do. |
| Sorbitol | 6 | do. |
| Sorbic acid | .2 | do. |
| Deionized water q.s. | 100 | do. | by the following procedure:

a. Preparation of the oily phase:

The fatty substances "Polystate" and "Tefose 1500," and the oily components, i.e. wheat germ oil, were heated in a water-bath at 35°–40°C until each of them was melted completely.

b. Preparation of the aqueous phase:

The water soluble products: sorbic acid and N-propionyl-ε-amino-caproic acid were dissolved in the amount of deionized water necessary for preparing the end product and the sorbitol.

This solution was heated to 40°C.

c. Preparation of the cosmetic emulsion:

The aqueous phase was introduced into the oily phase while stirring slowly and constantly until the mass had cooled completely. This was followed by a homogenizing step in a suitable apparatus.

EXAMPLE 3

A cosmetic cream having the following formula:

| | | | |
|---|---|---|---|
| N-propionyl-ε-amino-caproic acid | | 1 | gram |
| "Eumulgine C 700" | a product of the Henkel Company (polyglycolether on the basis of saturated fatty acids of $C_{16}$, $C_{18}$ and $C_{20}$ containing 67 to 69% of ethylene oxide) | 4 | gram |
| "Cetiol V" | (decylester of oleic acid) a product of the Henkel Company | 6 | gram |
| "Eutanol G" | (condensation product of saturated fatty alcohols, predominantly decyland stearyl alcohol a product of the Henkel Company of Germany, formed by the Guerbet reaction | 4 | do. |
| "Lanette O" | (mixture of equal parts of cetyl alcohol and stearyl alcohol) a product of the Henkel Company | 10 | do. |
| Wheat germ oil | | 11 | do. |
| Tocopherol acetate | | .1 | do. |
| Sorbic acid | | .2 | do. |
| Hamamelis water | | 10 | do. |
| deionized water q.s. | | 100 | do. | was prepared according to the following procedure:

a. Preparation of the oily phase:

All the fatty substances, i.e. "Lanette 0," oil-soluble emulsifiers: "Eumulgine C 700," the oily components: "Cetiol V," "Eutanol G," wheat germ oil, were heated in a water-bath to about 60° to 70°C.

b. Preparation of the aqueous phase:

The water-soluble products: N-propionyl-ε-amino-caproic acid and sorbic acid, were dissolved in the aqueous phase containing the hamamelis water (witch hazel) and the deionized water necessary for preparing the end product. This phase was heated to 60°C.

c. Preparation of the cosmetic cream proper:

Both phases (a) and (b) were combined while stirring slowly and the emulsion was mixed until it had cooled to about 30° to 40°C. The pH value of the cream was adjusted between 5.5 to 5.8. This operation was followed after cooling by a homogenization step in a suitable apparatus.

EXAMPLE 4

Preparation of a cosmetic cream

A cosmetic cream having the following formula:

| | | |
|---|---|---|
| N-propionyl-ε-amino-caproic acid | 1 | gram |
| "Polawax" (an non ionic emulsifier containing polyoxyethylenated alcohol) a product of the Creda Ltd Company of Great Britain | 9 | do. |
| Lanoline oil | 2 | do. |
| Wheat germ oil | 14 | do. |
| Cetyl alcohol | .5 | do. |
| Stearic alcohol | 5 | do. |
| Triethanolamine | 2.5 | do. |
| Sorbic acid | .2 | do. |

EXAMPLE 4-Continued

Preparation of a cosmetic cream

| | | |
|---|---|---|
| deionized water q.s. | 100 | do. | was prepared by following the procedure hereinafter discribed:

Mode of preparation a. Preparation of the oily phase:

All the fatty substances, the oily excipients and the oil-soluble products: "Polawax," lanoline oil, wheat germ oil, cetyl alcohol, stearic alcohol, triethanolamine, were heated in a water-bath to a temperature of 60° to 65°C.

b. Preparation of the aqueous phase:

The water-soluble products: sorbic acid and N-propionyl-ε-amino-caproic acid were dissolved in the aqueous phase: hamamelis water (witch hazel) and the deionized water necessary for making the cosmetic preparation. This phase was heated to 60°C.

c. Preparation of the cosmetic cream:

Both phases were combined while stirring slowly and the emulsion was mixed until it had cooled to about 30° to 40°C. The pH of the cream was adjusted to a value between 5.5 and 5.8. This was followed by a homogenization.

EXAMPLE 5

An orally applicable liquid was prepared by forming the following solution:

| | | |
|---|---|---|
| N-propionyl-ε-amino-caproic acid | 22.37 | g |
| sodium carbonate | 4.78 | g |
| purified water q.s. | 100 | ml |

UTILITY

Tolerance

The compositions of the invention in the form of the imbibable solution of Example 5 were orally administered to rats and mice during periods of time of up to 45 days and in amounts of 100, 200 and 300 mg/kg. No mortality was found in any of the treated animals which could be considered due to the compounds of the invention. The histological examination after death did not show any changes in major internal organs in any of the treated animals.

Ultraviolet Burns, Topical Application

The back skin of rats was subjected to depilation and then exposed to ultraviolet rays produced by a 300 W Philips sunlamp during 10 minutes (type MLH lamp). The source of radiation was at a distance of 50 cm from the animal. A serious burn was thus produced which was substantially the same as sunburns.

The animals then received applications of the cream described in Example 1 which contained 5% active substance. The cream was applied in amounts of 1 g/day in two applications during 4 consecutive days.

The results obtained were compared with control animals which had not been treated in the same manner. In the treated animals the phlyctenas rapidly disappeared and the scaling (desquamation) was minor. Such results were not obtained in the control animals.

Wax burns, oral application

Male and female Wister rats of about 200 g average weight were isolated in individual cages. Three groups of subject animals were formed:

The first group was constituted by 15 control animals. The second group was constituted by 15 animals which received 100 mg/kg per day of the composition described in Example 5. The third group comprised 15 animals and receive 200 mg/kg of the same composition.

The administration was effected by gastric sound in the morning before feeding and was effected 6 times a week.

The burn was formed in the central back area of the skin of each animal. This area was first depilated with cosmetic wax 24 hours ahead of the test. The animals were then anaesticized with ether. In the center of the depilated zone which had previously been disinfected an open cylindrical stencil of 5 $cm^2$ surface area was applied. Into the center of the stencil 5 ml of wax which had been heated to 200°C were poured. The wax was left in place for a period of 5 minutes. After cooling down the wax could easily be removed without adhering to the skin. The burn was then protected by a sterile bandage.

For planimetric study of burnt surface, measurements were taken every 5 days until complete cicatrization occured.

a. Control animals

After application of boiling wax, a phlyctena develops on the burnt zone and its surface area is that of the mold, namely 500 $mm^2$. This phlyctena contains a serohematic exudate which is very rich in albumen. A few hours later, the phlyctena liquid coagulates and forms a solid film which covers the burnt surface. During a period of 12 days, the burnt surface does not undergo any change. The scar tissue then develops along the edges of the burn and thrusts back the surface film which finally falls off. The scar tissue is granulated and is of poor quality. Complete cicatrization is obtained in 55 days.

b. Treated batches

In the two treated batches, (composition of Example 5) a positive acceleration of the burn repair is observed.

The initial phlyctena dissappears more rapidly. From the fifth day the appearance of scar tissue on the edges of the burn is observed. Progression of the scar tissue takes place with epidermization. In the treated batches, complete cicatrization is obtained in:

45 days in the group treated with 100mg/kg/day of N-propionyl-ε-amino-caproic acid.

35 days in the group treated with 200mg/kg/day of N-propionyl-ε-amino-caproic acid.

The planimetric measurements are recorded in the following table:

| Time in days | Controls | Treated with N-propionyl-ε-amino-caproic acid (composition of Ex.5) | |
|---|---|---|---|
| | | 100 mg/kg | 200 mg/kg |
| 0 | 500 | 500 | 500 |
| 5 | 500 ± 10 | 500 ± 10 | 500 ± 10 |
| 10 | 495 ± 15 | 420 ± 15 | 450 ± 16 |
| 15 | 480 ± 20 | 400 ± 10 | 360 ± 20 |
| 20 | 460 ± 15 | 320 ± 12 | 255 ± 15 |
| 25 | 430 ± 20 | 255 ± 20 | 160 ± 12 |

-Continued

| Time in days | Controls | Treated with N-propionyl-ε-amino-caproic acid (composition of Ex.5) | |
|---|---|---|---|
| 30 | 350 ± 15 | 200 ± 18 | 80 ± 15 |
| 35 | 310 ± 12 | 120 ± 18 | 25 ± 10 |
| 40 | 260 ± 10 | 80 ± 15 | |
| 45 | 140 ± 15 | 31 ± 18 | |
| 50 | 80 ± 14 | | |
| 55 | 30 ± 13 | | |
| 60 | 9 | | |

Conclusion

N-propionyl-ε-amino-caproic acid has a beneficial action on the experimental burns; in fact, whereas the control burns heal with scar formation in 60 days, the burns which are treated with N-propionyl-ε-amino caproic acid heal with scar formation in 45 days in the batch which is treated with 100 mg/kg and in 35 days in the batch which is treated with 200 mg/kg.

Wounds with loss of substance, oral application

Wister rats, males and females of approximately 200 g were used.
They were divided into 3 groups of 20 animals each:
1st group: 2 groups of 10 control animals each.
2nd group: 2 groups of 10 aminals each receiving 100 mg/kg per day.
3rd group: 2 groups of 10 animals each receiving 200 mg/kg per day.
Administration per os by gastric pound in the morning before feeding, 6 days per week of the composition of example 5.

The wounds were produced in the central dorsal region. In this region, the skin was depilated with a cosmetic wax 24 hours before beginning of the test.

In a first stage, 1,5 ml of a 1% croton oil solution in sterile olive oil was injected into the subcutaneous adipose tissue of the depilated zone. There took place around the point of injection an aseptic necrosis of the tissues which extended from the epidermis to the Platysma myoides. After a period of 24 hours, the central portion of the necrotized zone was cut so as to form a uniform rectangular wound having an area of approximately 150 mm². The wound was of substantial depth; it extended to all layers of the cutaneous covering and involved the platysma myoides. The edges and the bottom of the wound were the seat of inflammatory and necrotic phenomena which delayed cicatrization.

The wound was protected by a sterile bandage. The animals were placed in separate cages.

The evolution of cicatrization was evaluated by planimetry of the area of the wound; measurements were taken daily during the first 5 days, then every 2 days until complete cicatrization had occurred.

The results are recorded in the tables below which relate to:
planimetric evolution of the control wounds (table No. 1)
planimetric evolution of wounds treated with 100 mg/kg of N-propionyl-ε-amino-caproic acid, composition of Example 5. (table No. 2)
planimetric evolution of wounds treated with 200 mg/kg of N-propionyl-ε-amino-caproic acid, composition of Example 5. (table No. 3)

These tables record first of all the planimetric evolution of the wounded area, then the percent reduction of the wound area with respect to the initial area.

TABLE No I

Planimetric evolution of control animals

| Time in days | Group 1 | Group 2 | Mean Value | Area % relative to initial area |
|---|---|---|---|---|
| 0 | 150 | 150 | | |
| 1 | 200 | 210 | 205 | |
| 2 | 240 | 260 | 250 | |
| 3 | 250 | 260 | 255 | |
| 4 | 250 | 260 | 255 | |
| 6 | 240 | 250 | 245 | |
| 8 | 210 | 220 | 215 | |
| 10 | 200 | 220 | 210 | |
| 14 | 160 | 140 | 150 | |
| 16 | 140 | 100 | 120 | 80 % |
| 20 | 80 | 90 | 85 | 57 % |
| 24 | 50 | 70 | 60 | 40 % |
| 28 | 30 | 50 | 40 | 27 % |
| 30 | 30 | 40 | 35 | 24 % |
| 34 | 20 | 30 | 25 | 17 % |
| 38 | 10 | 20 | 15 | 10 % |
| 40 | 5 | 9 | 7 | 5 % |

TABLE No II

Planimetric evolution of treated wounds:

N-propionyl-ε-amino-caproic acid (composition of Example 5) - 100 mg/kg per day

| Time in days | Group 1 | Group 2 | Mean Value | Area % relative to initial area |
|---|---|---|---|---|
| 0 | 150 | 150 | | |
| 1 | 180 | 210 | 190 | |
| 2 | 190 | 210 | 200 | |
| 3 | 210 | 230 | 220 | |
| 4 | 220 | 240 | 230 | |
| 6 | 205 | 215 | 210 | |
| 8 | 170 | 190 | 180 | |
| 10 | 140 | 160 | 150 | |
| 14 | 110 | 130 | 120 | 80 % |
| 18 | 55 | 65 | 60 | 40 % |
| 22 | 35 | 45 | 40 | 27 % |
| 26 | 15 | 35 | 25 | 17 % |
| 30 | 8 | 12 | 10 | 7 % |

Mean value per group of 10 animals - surface area in mm²

TABLE No. III

Planimetric evolution of treated wounds:

N-propionyl-ε-amino-caproic acid - 200 mg/kg per day (composition of Example 5)

| Time in days | Group 1 | Group 2 | Mean value | Area % relative to initial area |
|---|---|---|---|---|
| 0 | 150 | 150 | | |
| 1 | 190 | 170 | 180 | |
| 2 | 220 | 190 | 210 | |
| 3 | 225 | 215 | 220 | |
| 4 | 215 | 195 | 210 | |
| 6 | 190 | 150 | 170 | |
| 8 | 150 | 130 | 140 | 94 % |
| 10 | 115 | 105 | 110 | 80 % |
| 14 | 65 | 55 | 60 | 40 % |
| 16 | 35 | 25 | 30 | 20 % |
| 18 | 20 | 20 | 20 | 14 % |
| 20 | 12 | 8 | 10 | 7 % |

Mean value per group of 10 animals - Surface area in mm²

The following appears:

The control wounds heal slowly; during the four days which follow infliction of the wound, an enlargement of the injured surface is noted. The edges of the wound are highly inflamed and the bottom is congested. This stage is followed by a stationary period which extends until the 6the day approximately; the wound is covered with fibrous deposits and the exudation is substantial. Towards the 10th day, the inflammatory phenomena decrease and the necrotized zones are eliminated. Fleshy buds are formed at the bottom of the wound.

From this moment, there is observed a progressive retraction of the cruentous area, epithelialization begins at the edges of the wound on about the 20th day and continues slowly. Complete healing is obtained in 40 days. Epithelialization is then complete but the scar is depressed and fibrous.

In the two batches of treated wounds, cicatrization is more rapid.

The wounds of animals which have been treated with N-propinyl-ε-amino-caproic acid progress in the same manner as the control wounds during the first 4 days although the initial expansion is less substantial and the perilesional inflammatory reactions are less intense.

The elimination of the necrotized zones is more rapid. Starting from the 8th day in the batches which have been treated with 200 mg/kg of N-propionyl-ε-amino-caproic acid, a reduction in the wound area is noted. This is observed on the 14th day in the batches which have been treated with the low dose (100 mg/kg).

Starting from this moment, the wound is filled with uniform connective tissue which is rapidly covered by the epidermis. The scar which is obtained is supple and the epidermis moves on a normal and supple connective base.

The complete scar is formed in thirty days in the batches which receive 100 mg/kg of N-propionyl-ε-amino-caproic acid and in 20 days in those which receive 200 mg/kg of N-propionyl-ε-amino-caproic acid.

In both cases, the scar is of good quality.

The action of N-propionyl-ε-amino-caproic acid on the cicatrization of wounds with loss of substance is particularly marked.

The control wounds heal in 40 days and the scar which is obtained is fibrous and retracted.

In the treated batches, cicatrization is more rapid: it is obtained in 30 days in the batches which have been treated with the small dose: 100 mg/kg; cicatrization is obtained in 20 days in the batches which have been treated with the high dose: 200 mg/kg.

In both cases, the scar is supple and well epidermized.

This also shows that the N-propionyl-ε-amino-caproic acid not only results in an acceleration of the cicatrization but that it also prevents hypertrophic scar formation.

Linear wounds without loss of substance

Male and female Wister rats weighing approximately 200 g were used and divided into 3 groups of 40 animals:
1st group: 4 batches of 10 animals which serve as controls
2nd group: 4 batches of 10 animals which receive 100 mg/kg per day
3rd group: 4 batches of 10 animals which receive 200 mg/kg per day.

Administration per os and by gastric probe in the morning before feeding, 6 days per week.

Doses administered: 100 mg/kg and 200 mg/kg per day, depending on the batches, of composition of Example 5.

Linear incision was performed on the teguments of the dorsal region at right angles to the axis of the spinal column in the central region.

The teguments were depilated with cosmetic wax 24 hours prior to operation.

After careful disinfection of the operational zone, a clean 3 centimeters length incision was formed which extended through all the skin layers so as to reach the platysma myoides. The incision was sutured by means of three separate nylon stitches.

A study of the resistance of the scar tissue was carried out by means of a mercury tensiometer. The measurements of the force which was necessary to break the scar were carried out on the anesthetized living animal; the stitches were removed at the actual moment of measurement.

The measurements were taken on the 2nd, 4th, 8th and 16th days after incision on batches of 10 animals of each group.

Results

The results obtained are recorded in the tables given hereunder:

| Measurement of the rupture force : control batches | | |
|---|---|---|
| 2 days | 15 g ± | 8 |
| 4 days | 400 g ± | 20 |
| 8 days | 1,000 g ± | 250 |
| 16 days | 2,500 g ± | 200 (mean value in respect of 10 animals) |
| Measurement of the rupture force : treated wounds: | | |
| N-propionyl-ε-amino-caproic acid - 100 mg/kg | | |
| 2 days | 15 g ± | 5 |
| 4 days | 550 g ± | 30 |
| 8 days | 1,800 g ± | 250 |
| 16 days | 3,000 g ± | 200 |
| Measurement of the rupture force : treated wounds: | | |
| N-propionyl-ε-amino-caproic acid - 200 mg/kg | | |
| 2 days | 20 g ± | 8 |
| 4 days | 600 g ± | 50 |
| 8 days | 2,000 g ± | 200 |
| 16 days | 3,500 g ± | 250 |

The results show that N-propionyl-ε-amino-caproic acid assists the formation of the connective scar tissue between the lips of a linear wound of surgical type. This action is very positive in the batches which have been treated with a high dose: in fact, the resistance of the wound on the 8th day has a value which is double that of the control animals. An activity however is also detectable in the case of the small dose.

Fractures, oral application

Male and female Wister rats weighing approximately 200 g.

Three groups of 20 rats distributed as follows:
1st group : 2 batches of 10 animals serve as controls
2nd group : 2 batches of 10 animals receive 100 mg/kg
3rd group : 2 batches of 10 animals receive 200 mg/kg.

Administration per os and by gastric probe, in the morning before feeding and for 6 days per week, of 100 mg/kg and 200 mg/kg, depending on the batches of composition of Example 5.

Fracture of the central part of the tibia caused by breaking between two Kocher's forceps without injuring the teguments while avoiding muscular impairment around the seat of fracture.

The rats were anesthetized with ether.

The fractures were neither reduced nor fitted with apparatus.

a. Clinical examinations during which it is sought to evaluate the mobility of the two bone fragments and the strength of the callus.

b. X-ray examinations carried out at 4-day intervals.

c. Histological examinations of the seat of ossification.

Histological methods:

Fixation-decalcification with formol-complexon according to Chevance.

Coloring with picro-fuchsin alcian-blue which makes it possible to differentiate between the connective tissue, the cartilage and the bone tissue.

Comparison between the treated batches and the control batches.

a. Evolution of fractures in control animals

Union of experimental fractures of the tibia takes place in accordance with the following process in the controls:

premature vasculo-edematous phenomena are observed shortly after traumatism. The fractured paw is edematous and congestive for a period of approximately 1 week.

clinical examination reveals the appearance of a solid callus only on about the twentieth day, the bone fragments being mobile relative to each other for approximately 3 weeks.

X-ray examination permits detection of small zones which are opaque to X-rays in the focus of fracture on about the 12th day. Said zones are in contact with the bone fragments. Between the 15th and 20th day, the ossification regions develop within the callus in two different sites:

. starting from the osteogenic layer of the periosteum in the zone of periosteal detachment, in the fibrous and cartilaginous callus, there develop regions of tissue which is opaque to X-rays and these are metaplastic ossification zones.

After 30 days of evolution, the osseous sleeve is more opaque and extensive; osseous ribs which connect the fragments of the fractured tibia are visible.

By radiological observation union of the fractured bone is obtained in 45 days in 80% of the cases, the focus of fracture is completely surrounded by ossified tissue. The bone union takes place in a vicious position: in the majority of instances, angulations, contractions of the tibia are observed. In 20% of the cases, the formation of pseudarthroses is observed as well as delays in consolidation which last up to 60 days.

There takes place around the perifractural hematoma a substantial connective reaction which colonizes the hematoma when this latter is vascularized.

The repair callus is constituted by an internal zone and an external zone of different nature.

The internal callus is formed by the cells of the osteogenic layer of the endosteum and by the cells of the bone marrow. Its evolution is slow.

The external callus is constituted in a first stage by very fibrous connective tissue and is formed by fibroblasts, histiocytes and monocytes. This connective tissue penetrates into the focus of fracture, colonizes the perifractural hematoma and extends to a distance up to the point of periosteal detachment. This purely connective stage lasts only a short time. On about the 12th day, the cartilage regions develop and osteoid tissue is produced from the osteogenic layer of the periosteum.

In consequence, the cartilaginous tissue increases whereas the connective tissue recedes. Vascularization of the callus is ensured by a fine network of highly ramified neovessels.

Starting from the osteogenic layer of the periosteum, bone ribs develop and spread over the cartilaginous zones, the dividing line between the cartilage and the bone becomes attenuated and the two tissues interpenetrate without interruption.

On the 13th day, ossification zones arising from the osseous transformation of the connective tissue and of the cartilaginous cells appear in the fibro-cartilaginous callus.

Finally, towards the 40th day, the external callus is largely ossified but cartilaginous zones are still visible. The repair tissue joins the bone fragments to each other.

Between the fragments of the fractured bone, there also develop a fibrous callus which is then fibro-connective and cartilaginous and forms an extension of the external callus.

Towards the 45th day, the external callus is ossified but there can still be observed cartilaginous zones in which the development of ossification is slower.

The evolution of fractures in rats treated with N-propionyl-ε-amino-caproic acid is studied by the same methods as those applied to the inspection of control fractures.

The first pictures of calcification are visible from the 8th day onwards; islands of substance which is opaque to X-rays are observed in the peripheral callus and in contact with the bone fragments. The osseous sleeve develops rapidly around the seat of fracture. On the 13th day, the external callus is ossified as shown by X-ray inspection and only non-ossified clear zones remain in the inter-fragmentary space.

The acceleration of the process is more marked in the batches which are treated with 200 mg/kg of N-propionyl-ε-amino-caproic acid.

The data of histological examinations bring out the following points:

The premature phenomena are comparable in all respects with those observed in the control batches.

From the 8th day onwards, the fibro-cartilaginous callus is constituted by a tissue which is rich in collagen fibers, in cartilaginous cells and the presence of an osteoid tissue at the periphery of the callus is already observed.

On the tenth day, islands of metaplastic bone are visible in the external callus, in the zones of connective tissue as well as in the cartilaginous zones. The osseous ribs derived from the osteogenic layer of the periosteum develop and merge into the bone of metaplasic origin.

On the 20th day, the external callus is partly ossified and is invaded by lamellae of trabecular bone. Only isolated and inextensive cartilaginous zones remain.

On the 13th day of evolution, the peripheral callus is formed by osteoid tissue with very few cartilaginous islands. The internal callus is totally ossified.

Out of the 20 fractures which are treated with N-propionyl-ε-amino-caproic acid with a dose of 200 mg/kg, 60% of the cases are united on the 13th day; out of the remaining 40%, union is obtained in 40 days.

Out of the 20 fractures treated with N-propionyl-ε-amino-caproic acid with a dose of 100 mg/kg; in 65% of the cases, bone union is complete after 35 days of treatment whilst the other cases have mended in 40 days on an average.

Under the test conditions and in the case of fracture of the tibia in a rat, acceleration of the ossification processes is observed in the batches of animals treated with N-propionyl-ε-amino-caproic acid.

This activity is pronounced when a high dose of N-propionyl-ε-amino-caproic acid is administered (200 mg/kg) but still remains detectable at a lower dose.

The last tests show that the compositions containing N-propionyl-ε-amino-caproic acid are effective additionally to prevent the formation of pseudoarthroses.

With the control animals a radiological observation of the fracture showed after 45 days that the union of the fractured bones had taken place in a poor position. In the majority of the cases curvatures and shortenings of the tibia could be observed and about 20% of the cases were subject to pseudoarthroses.

On the other hand with the treated animals bone union was established in only 30 days in 60% of all cases. In this group and in the group where bone union was observed only after 40 days, that is with the remaining 40% no indication was found of any pseudoarthrosis.

Internal organs

The following tests relate to the prevention and treatment of scleroses of the pancreas and to the prevention and treatment of peritoneal adhesions.

To test the compositions of the invention in the treatment of pancreatic scleroses which are incidental to acute pancreatitis a number of experiments were carried out with dogs.

The technique to induce an acute hemorrhagic and necrotic pancreatitis in dogs has been known since 1961. In these experiments pathological lesions were caused to develop which were entirely identical with those observed in man.

The dogs used in the experiments had an average weight of 20 to 25 kg. An acute hemorrhagic and necrotic pancreatitis ("P-A-H-N") was induced by injection, into the main pancreatic canal, of a mixture of bile juice and pancreatin. For this purpose a 250 mg ampoule of Choay pancrease was employed which contained 25% α-chymotrypsin, 2% trypsin, 10% elastase-elastomucoproteinase, 0.3% ribonuclease. The injection was effected by the transpapillary way after incision into the duodenum under weak pressure. This has the advantage to leave the pancreatic canal open after injection.

This technique has uniform results since among 90 dogs in a preliminary test series in 88 cases P-A-H-N was induced as verified by macroscopic and histologic examination. The P-A-H-N thus created is fatal for the animal in nine times out of ten in the absence of treatment. In order to obtain a prolonged pancreatitis it was therefore necessary to apply some treatment to the animals for the purposes of the tests.

The comparative tests were carried out in 20 dogs which were divided into two groups, ten dogs in a control group and ten dogs in the test group. The control group did not receive any medication. The test group was given the following treatment by causing to perfuse the following mixture of components through the body on the first day 30 minutes after start of the P-A-H-N for a time of one hour:

| | | |
|---|---|---|
| glucose serum 10% | 500 | ml |
| Novocaine 5% | 10 | ml |
| neutral atropine sulfate | 0.5 | mg |
| hydrocortisone hemisuccinate | 50 | mg |
| "Iniprol" (protease inhibitor) | 3,000,000 | units |

On the second day a slow intravenous injection was effected of the following mixture:

| | | |
|---|---|---|
| glucose serum 5% | 50 | ml |
| neutral atropine sulfate | 0.5 | mg |
| hydrocortisone hemisuccinate | 50 | mg |
| Iniprol | 2,000,000 | units |

From the 3rd to the 21st day only 10 g of N-propionyl-ε-amino caproic acid was administered in four doses during a period from 8 to 20 hours. The acid was in the form of a solution as described in Example 5 above.

The treated animals accordingly received the composition of the invention orally at a time starting 48 hours after onset of the P-A-H-N.

The results obtained with these two series of tests were compared with a previous test series in which 40 dogs were involved in which P-A-H-N had also been caused to develop and which had then been subjected to a resuscitation which combined hydroelectrolytic resuscitation, treatment with corticoids in the form of the hemisuccinate, and treatment with protease inhibitors ("Iniprol"). In this previous test series 30 survivals were obtained in 40 animals but in the surviving animals 4 to 6 weeks after the revival treatment pancreatic atrophic sclerosis was found to exist. The treatment apparently had an effect almost exclusively on the initial shock syndrome.

The histological studies in this test series showed that from the 5th or 6th day already an atrophic pancreatic sclerosis had developed which eventually often resulted in a condition appearing exactly comparable to pancreatic cirrhosis.

In the main series of tests the following results were obtained.

In the control group 5 animals died in the first 48 hours, four animals died in the course of the first week, and one animal survived more than 4 weeks.

In this one animal an atrophic sclerosis of the pancreas was found.

Of the dogs which had been treated as above stated only two animals died in the first 48 hours. The surviving eight animals were sacrificed after a period of observation varying between 5 and 8 weeks. At the date of sacrifice they did not show any clinical evidence of any pancreatic external or internal defect and the majority of the animals had regained their original weight.

The results are further summarized in the following table:

TABLE No. I

| Test Series | No. of Animals | No. of Animals Surviving at the end of 1 week | Condition of the pancreas after 4-6 weeks |
|---|---|---|---|
| Control group | | | Atrophic sclerosis |

TABLE NO.-Continued

| Test Series | No. of Animals | No. of Animals Surviving at the end of 1 week | Condition of the pancreas after 4-6 weeks |
|---|---|---|---|
| without any treatment | 10 | 1 | of the pancreas in the one surviving animal |
| Resuscitation treatment other than with composition of the invention | 40 | 30 | Atrophic sclerosis of the pancreas in all surviving animals |
| Treatment with the composition of the invention (Example 5) in addition to resuscitation treatment | 10 | 8 | Subnormal pancreas; preservation of its structure; slight increase of the connective bridge tissue |

The N-propionyl-ε-amino-caproic acid accordingly had an inhibitory action on the sclerosis which develops within the inflamatory lesions of the connective tissue. This action is clearly preventive as appears from the fact that in all treated animals the acute hemorrhagic and necrotic pancreatitis had developed in a manner entirely different from the development in dogs which were not treated with the compound of the invention where in the surviving animals chronic atrophic sclerosis of the pancreas occurred in all cases.

In the treated animals a densification of the interlobular tissue was found regarding the interacinic bridge. This interlobular bridge shows a mutliplication of the non-differentiating star-shaped mesenchyatic cells. One does not find on the other hand the scleroses which are rich in collagen such as characteristic for the atrophic sclerosis mentioned before. The composition of the invention therefore appears to be not only an inhibitor of sclerosis but a true regulator of the cicatrization of the connective interstitial pancreatic tissue.

The action of the composition of the invention on the epithelial tissue of the acini is more difficult to interpret. In the control animals the epithelial necrosis was quite marked and in the surviving animals had resulted in an epithelial atrophy. The lobules were reduced to a few non-differentiated acini islets.

In the treated animals, in the areas effected by the initial P-A-H-N, a significant degranulation of the cells is found but without atrophy or loss of differentiation of the acini. The action of the composition on the epithelial tissue is therefore not all minor since as it seems the necrose is less intense than in the animals of the preliminary test series which had not received the compounds of the invention.

Peritoneal adhesions; oral administration

Abdominal surgery in men often causes the formation of viscero-visceral or viscero-pariatal adhesions particularly if the surgical action involves inflamatory lesions. The adhesions essentially result in the connective organization of fibrous deposits which may be hematic or non-hematic, at the level of the visceral or parietal areas which have been more or less opened by cutting into the peritoneum and which form secondary seats of a granular inflammatory reaction.

Tests carried out in this connection have confirmed that the N-propionyl-ε-amino-caproic acid exerts a preventive action on the formation of peritoneal adhesions.

Tendons, oral administration

These tests were carried out with 12 German sheepdogs, of which six constituted the control group and the other six the treated group.

On each animal two tendons of one of the rear legs were sectioned (i.e. a rear tendon homologue of the Achilles tendon in man and a finger-extensor front tendon).

The animals of the treated series received N-propionyl-ε-amino-caproic acid in the form of the composition of Example 5 in an amount of 300 mg/kg per day, by the oral route. To study the tendon cicatrization, histological portions were removed every 5 days from the 5th to the 30th day.

The following results were found:

In the non-treated series: the tendons remain swollen, irregular, ill-consolidated, until the 30th day. In the series of treated animals the sectioned tendon is cicatrized and has an appearance comparable to a normal tendon as early as the 30th day.

Moreover, the peritendinous atmosphere which is of sclerotic nature and does not permit the sliding of the tendon in the untreated series is on the other hand normal and non-fibrous and permits the functional sliding of the tendon in the animals treated with N-propionyl-ε-amino-caproic acid.

Action on aged skin; topical application a. Elongation

The animals used for this test were Wister male rats of the identical age of 30 months and of more or less equal weight. A strip, 3 cm long and 0.50 cm wide, was cut out in the dorsal area of the animal parallel to the axis of the vertical column. The skin strip was then fixed at the neck end to a stationary support. At the other end (the tail or caudal end) a traction force of 50 g was applied during five minutes. The length of the strip was then measured at the end of the 5 minutes without releasing the traction force.

This test permits to determine the elongation properties of the cutaneous covering and thus indicates the elasticity. With young animals an elongation can be obtained in this test which is considerably above that obtained with aged rats.

The animals were divided into three groups as appears from the following Table which also shows the percentage elongation.

TABLE

| Group | Weight of animls (in g) | Mean elongation by a traction force of 50 g (in cm) | | % Elongation | |
|---|---|---|---|---|---|
| | | Max.-min. span | | Max.-min. span | Max-min. span |
| Control; no treatment | 315 | 260 | +0,30 | 0,20 | |

TABLE—Continued

| Group | Weight of animls (in g) | Mean elongation by a traction force of 50 g (in cm) | | % Elongation | | |
|---|---|---|---|---|---|---|
| | | Max.-min. span | | Max.-min. span | | Max-min. span |
| | | 400 | | 0,40 | | |
| Control; treatment with placebo cream (Ex. 1) no caproic acid | 265 | 220 | ±0,28 | 0,20 | 0 | 0 |
| | | 320 | | 0,40 | | 66 |
| Cream of Ex.1 (invention) | 310 | 270 | +0,46 | 0,39 | + 53 | 30 |
| | | 350 | | 0,48 | | 60 |

The percentage elongation for the animals treated with the cream of the invention (Example I) was determined with reference to the elongation obtained with the control groups which was set as the zero value. Thus, a mean elongation was obtained in the animals treated with the cream of the invention of 53% which indicates a very substantial improvement of the elasticity.

b. Elasticity

N-propionyl-ε-amino-caproic acid in the form of the composition of Example 1 as applied percutaneously to castrated mice and its action as compared with that of a commercially available cosmetic cream ("Eterna 27" produced by Revlon) as well as with the action of the placebo as constituted by the excipient alone.

88 female mice aged from 3 to 4 months which were previously castrated were grouped as follows:

| | |
|---|---|
| 1 group of 16 and 2 groups of 15 | ) for studying the action of ) N-propionyl-ε-amino-ca- ) proic acid (Ex. 1) |
| 1 group of 16 and 2 groups of 15 | ) for studying the action of ) the "Eterna 27" cream |

1 group of 16 for testing the action of the excipient which is employed as placebo (as in Ex. 1 without the active agent).

These mice were maintained throughout the duration of the experiment on sterilized wood shavings which were changed 3 times per week. The tests were carried out as follows:

| Group | Number of animals | Compound | Concentration | | Duration of Tests |
|---|---|---|---|---|---|
| G 1 | 16 | N-propionyl-ε-amino-caproic acid | 50 | mg/m./day | 5 days |
| 2 | 15 | do. | 10 | do. | 5 do. |
| 3 | 15 | do. | 2 | do. | 5 do. |
| H 1 | 16 | Eterna 27 (Revlon) | 50 | mg/m./day | 5 days |
| 2 | 15 | do. | 10 | do. | 5 do. |
| 3 | 15 | do. | 2 | do. | 5 do. |
| T | 16 | Placebo excipient | 50 | mg/m./day | 5 do. |

The ointment were weighed each week for each group; the treatment consisted of a total of 25 applications.

The dose of 50 mg per day and per mouse corresponds to the application on the back of the mouse (shaved once a week) of 50 mg of ointment; the dose of 10 mg corresponds to 10 mg of ointment plus 40 mg of placebo, the dose of 2 mg corresponds to 2 mg of ointment plus 48 mg of placebo.

The autopsies were performed in the case of each group of mice exactly 5 weeks after commencement of the applications.

The skin fragment was sampled by cutting a predetermined area and was fixed with 10% formol after applying against a cork support in order that the skin should remain quite flat.

After an interval of 30 hours, a small piece was cut out at the center of said fragment and again placed in clean 10% formol in which it was left for 1 week. The pieces were coated with paraffin and cut to 7 $\mu$ and the cut sections were colored with hematoxylin-eosin.

Figure 1:
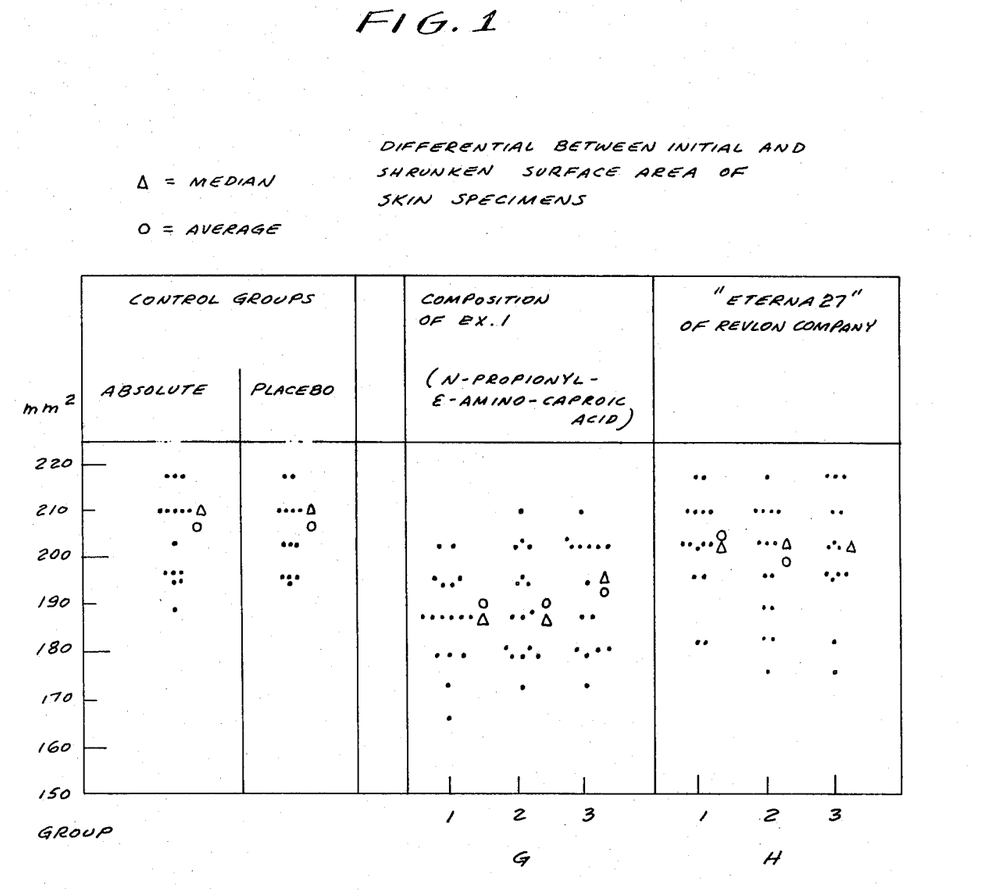
FIG. 1 shows the loss of surface area due to shrinking of strips of skin taken from various treated and untreated groups of mice. The amount of lost surface area is an indication of the elasticity of the skin.

With reference to the attached drawing an elasticity test was carried out with the samples immediately after preparing them as just described. It appears that the shrinkage, that is the area wiped out by shrinkage, is largest in the non-treated group. It is about equal in the group which was not treated at all and in the group which was treated with the cream as described in Example 1 but omitting the N-propionyl-ε-amino-caproic acid. A lower degree of shrinkage is obtained with the "Eterna 27" cream of the Revlon Company. This is a hormonal cream containing pregnenolone acetate as effective agent. However, a considerably better result is obtained with the cream of Example 1 which is applied in three different dosages as above defined.

In FIG. 1 the graduation in the left margin indicates the surface area which has been obliterated by shrinkage. In other words this is the difference between the initial surface area and the remaining surface area. As will be seen with the composition of the invention which involves a simple chemical compound as the active agent a considerable improvement is obtained over and above the hormonal cream "Eterna 27".

Figure 2:
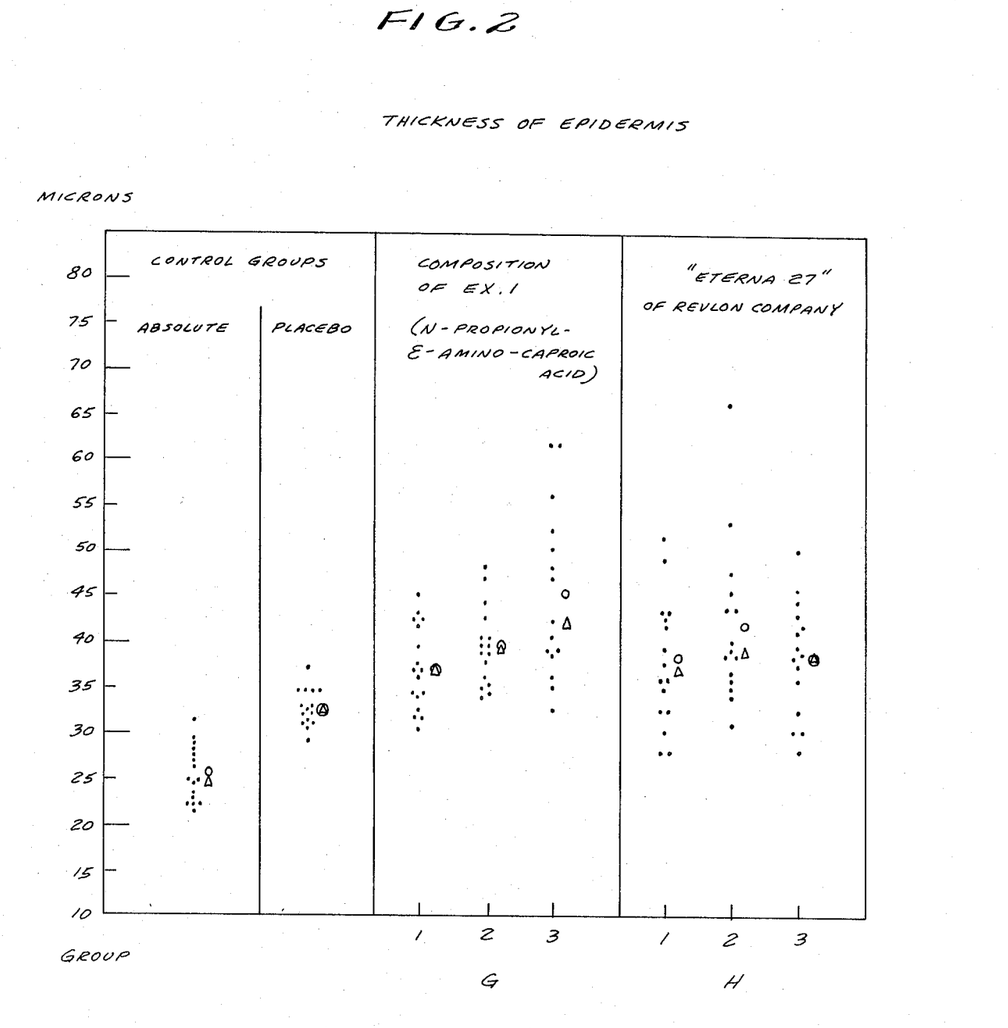
FIG. 2 shows measurements in microns of the thickness of the epidermis of various groups of mice which were treated with the cream of the invention as compared with untreated and otherwise treated mice. This test like the test of the amount of lost surface area due to shrinkage is an indication of the effects of aging on the skin.

With reference to FIG. 2 this Figure shows the thickness of the epidermis. The tests were carried out with a micrometer on colored slides. Twenty measurements were affected in each group on each slide.

As shown in FIG. 2 a certain improvement of the thickness is obtained with an ordinary skin cream such as the placebo cream (the cream of Example 1 without the acid of the invention). However, as appears a far greater increase in the thickness was obtained with the cream of the invention, this improvement again depending on the amount as administered in the different groups 1, 2 and 3.

With the Revlon cream "Eterna 27" a somewhat similar result was obtained although the result was not quite as good as with the cream of the invention with the highest dose (Group 3). However, this result with the Revlon cream was obviously due to the hormonal component. Since the present cream which is based on an ordinary chemical obtains a similar or even slightly better result it must be considered a substantial improvement. It is well known that hormonal compositions involve certain disadvantages and also substantially increase the price of the product.

Besides it will be seen while comparatively good results are obtained with the Revlon cream regarding the thickness of the epidermis, the results are definitely inferior insofar as the loss due to shrinkage, that is lack of elasticity, is concerned.

It is noted that in all mice involved in these tests, both in the control groups and the treated groups, there was a total absence of all estrogenic effects and of all reactions otherwise typical in mice subjected to ovariectomy.

Human tests

N-propionyl-ε-amino-caproic acid in the form of the composition of Example 5 was administered to patients suffering from cicatrization diseases in conjunction with connective tissue formation diseases, regardless of the anatomic location of this connective tissue. The patients were suffering from cutaneous cicatrization diseases or suffering from osseous uniondefects or suffering from diseases due to peritoneal accretions and membranes, although the above-mentioned medicament can also be administered in a considerable wider field of human therapy, as clearly evidenced by the present disclosure.

1. A 41-year old patient was admitted to the hospital for deep 2nd-degree burns. The wounds are the seat of pathogenous golden staphylococci.

An anti-infectious treatment is combined with a treatment with N-prionyl-ε-amino-caproic acid in an amount of 20 g per day in four fractions (4 ampuls of 5 g each, administered by oral route).

On the 30th day after the beginning of this treatment a spontaneous cicatrization of all wounds is observed, except for an area (left lower limb) constituting a 3rd-degree burn. This area is covered with autograft-patches adhering perfectly on the 12th day after the wound had been closed by the graft.

Due to the action exerted by N-propionyl-ε-amineo-caproic acid, a rapid cicatrization, without sequelae, of large deep 2nd-degree burns has been obtained. A wound caused by a 3rd-degree burn, covered with an antugraft-patch of which the 100% adherence was obtained within the extremely short time of 12 days.

2. a 32-year old patient had a long history of post-phlebitic ulcers of the leg (first varicose ulcer in 1955, second ulcer in 1958, third attack in 1960 which did not cicatrize completely until May 1960 when the patient was admitted for treatment).

5 g of N-propionyl-ε-amino-caproic acid 4 times per day orally.

Results: On the 8th day an extraordinary epidermization is observed, on the 15th day more than half the surface of the ulcers is epithelialized, and on the 35th day the cicatrization is complete and of very good quality.

No recurrence was observed in this patient who was regularly supervised since then.

3. A 33-year old patient, a mason had a closed fracture of right-hand carpian scaphoid bone.

Immobilzing of the fractured bone in plaster during 45 days during which the patient receives N-propionyl-ε-amino-caproic acid administered in an amount of 20 g per 24 hours.

On the 45th day the plaster is removed and the clinical examination shows that the fracture is united (absence of pain, when the wrist is pressed and moved, absence of oedema, normal mobility of wrist). The X-ray examination confirms the data obtained in the clinical examination. The union is complete.

Scaphoid bone fractures treated only by plaster fastening are consolidated as a rule after 90 days; therefore, the administration of N-propionyl-ε-amino-caproic acid reduced this period by one-half in the case considered herein.

4. A 20-year old student was admitted for acute apendicitis. Two months later, upper intestinal occlusion by intestinal membranes; removal of the accretions and membranes. 45 days later, second intestinal acclusion by strongly developed peritoneal membranes and accretions; removal of these membranes and accretions. One month later, new intestinal occlusion due to extremely rapid development of new membranes and new accretions; resection of the intestinum tenue (12 feet) and beginning of treatment with N-propionyl-ε-amino-caproic acid in an amount of 20 grams daily during 2 months.

After 2 years, the enteric passage is perfectly normal and the general condition of the patient quite satisfactory.

Summary of activity

1. The cicatrication of wounds with loss of substance is clearly accelerated. It is accomplished in 30 days with animals receiving 100 mg/kg and in 20 days with animals receiving 200 mg/kg while the non-treated control group required 40 days. Besides the formed scar is softer and more adapted to the general structure of the epidermis. In addition it appears that the composition of the invention has a preventive action against the hypertrophic development of scars.

2. Linear wounds without loss of substance show a higher tensile strength with the animals treated with 200 mg/kg. The wound in this group on the 8th day is twice as strong as the comparative wound in the control group.

3. In the case of burns planimetric studies show that the time of cicatrization in the control group requires 60 days while with the animals receiving 100 mg/kg of the composition of the invention it requires 45 days and with animals receicing 200 mg/kg it requires only 35 days.

4. X-ray examinations and histological studies show that the ossification process is accelerated in treated animals and particularly in those animals receiving 200 mg/kg. In this case 60% of the fractures are healed in 30 days, 40% in 40 days. With the control group the average healing time was 45 days.

Moreover in the treated animals there appear no pseudoarthroses which shows that the compositions of the invention prevent vicious union of fractures.

5. The compositions of the invention also act as inhibitors of scleroses and as regulators of the cicatrization of the connective tissue of the peritoneum.

6. The compositions of the inventions are active in maintaining or reforming the elasticity of the dermis and the thickness of the epidermis which in turn makes them useful in connection with wrinkles both as a preventive agent and in the treatment of existing wrinkles.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended claims:

1. A method for the treatment of a mammal suffering from a cutaneous wound or burn or from a bone fracture, comprising the steps of orally or topically administering to said mammal a therapeutically effective dose of a pharmaceutical composition containing as the active imgredient N-propionyl-epsilon-aminocaproic acid or a pharmaceutically acceptable salt thereof and a pharmaceutically acceptable carrier therefor.

2. A method as defined in claim 1, in which said oral or topical administering is continued for a period between several days and several months.

* * * * *